(12) United States Patent
Kato

(10) Patent No.: US 10,162,503 B2
(45) Date of Patent: Dec. 25, 2018

(54) IMAGE PROCESSING APPARATUS AND METHOD OF DISPLAYING OBJECT IN IMAGE PROCESSING APPARATUS

(71) Applicants: KABUSHIKI KAISHA TOSHIBA, Tokyo (JP); TOSHIBA TEC KABUSHIKI KAISHA, Tokyo (JP)

(72) Inventor: Hiroyuki Kato, Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 65 days.

(21) Appl. No.: 15/346,359

(22) Filed: Nov. 8, 2016

(65) Prior Publication Data

US 2017/0052687 A1 Feb. 23, 2017

Related U.S. Application Data

(63) Continuation of application No. 14/804,592, filed on Jul. 21, 2015, now Pat. No. 9,525,791.

(30) Foreign Application Priority Data

Jul. 22, 2014 (JP) .................................. 2014-148638

(51) Int. Cl.
*G06F 3/0484* (2013.01)
*H04N 1/00* (2006.01)
*G06F 3/0482* (2013.01)

(52) U.S. Cl.
CPC ........ *G06F 3/04845* (2013.01); *G06F 3/0482* (2013.01); *G06F 3/04842* (2013.01); *H04N 1/00408* (2013.01); *H04N 1/00411* (2013.01); *H04N 1/00413* (2013.01); *H04N 1/00474* (2013.01); *H04N 1/00477* (2013.01); *H04N 1/00514* (2013.01); *H04N 2201/0094* (2013.01)

(58) Field of Classification Search
None
See application file for complete search history.

(56) References Cited

U.S. PATENT DOCUMENTS 6,978,095 B2 12/2005 Kato
2011/0191611 A1 8/2011 Boni Ang Gaw Go et al.
(Continued)

FOREIGN PATENT DOCUMENTS

JP 2007-156778 6/2007
JP 2009-033451 A 2/2009
(Continued)

OTHER PUBLICATIONS

Japanese Office Action dated Jan. 5, 2018, filed in counterpart Japanese Patent Application No. 2014-148638, 8 pages (with machine translation).

*Primary Examiner* — Andrew H Lam
(74) *Attorney, Agent, or Firm* — Patterson & Sheridan, LLP

(57) ABSTRACT

In one embodiment, an image processing apparatus has a display, a memory and a processor. The display displays a plurality of objects. The memory stores display setting data for displaying the objects. When a move button which is added to the object detects an operation of a user, the processor edits the display setting data so that display positions of the relevant object and an object which is paired with the relevant object are exchanged.

12 Claims, 18 Drawing Sheets

(56) References Cited

U.S. PATENT DOCUMENTS

| | | |
|---|---|---|
| 2012/0023451 A1 | 1/2012 | Kuroyanagi |
| 2012/0212437 A1* | 8/2012 | Kobayashi ............ G06F 1/1624 345/173 |
| 2012/0317477 A1 | 12/2012 | Kotake |
| 2013/0135676 A1 | 5/2013 | Sakata |
| 2013/0249953 A1* | 9/2013 | Shimizu ................... G09G 5/38 345/681 |
| 2014/0006990 A1 | 1/2014 | Harada et al. |
| 2014/0129006 A1 | 5/2014 | Chen et al. |
| 2014/0375579 A1 | 12/2014 | Fujiwara |
| 2015/0026632 A1 | 1/2015 | Wakabayashi et al. |
| 2015/0234566 A1 | 8/2015 | Kanda et al. |
| 2015/0286388 A1 | 10/2015 | Jeon et al. |
| 2015/0342454 A1 | 12/2015 | Foster et al. |
| 2017/0010766 A1 | 1/2017 | Nakashima |

FOREIGN PATENT DOCUMENTS

| | | |
|---|---|---|
| JP | 2011-138437 A | 7/2011 |
| JP | 2013-196414 A | 9/2013 |
| WO | 2012160920 | 11/2012 |
| WO | 2015/151619 A1 | 10/2015 |

\* cited by examiner

IMAGE PROCESSING APPARATUS AND METHOD OF DISPLAYING OBJECT IN IMAGE PROCESSING APPARATUS

CROSS-REFERENCE TO RELATED APPLICATIONS

This is a continuation of U.S. patent application Ser. No. 14/804,592, filed on Jul. 21, 2015, which is based upon and claims the benefit of priority from the prior Japanese Patent Application No. 2014-148638, filed on Jul. 22, 2014, the entire contents of each of which are incorporated herein by reference.

FIELD

Embodiments described herein relate generally to an image processing apparatus and a method of displaying an object in an image processing apparatus.

BACKGROUND

In recent various electronic apparatuses, products having an image display unit of a touch panel system doubling as an operation input unit have been increasing. The electronic apparatus like this displays a plurality of objects (icons) as software buttons or short cut buttons on the image display unit. In the electronic apparatus, a user selects (performs touch operation) any icon with a finger, a pen or the like. The electronic apparatus detects a touch operation of the user, and thereby performs a specific function corresponding to the relevant icon, or displays a screen for detailed setting of the relevant specific function.

In the electronic apparatus as described above, from the viewpoint of improving the operability of a user, there may be a case to customize display positions of icons by changing the arrangement of a plurality of displayed icons, so that a user can easily use the apparatus. As ones which have dealt with such a need, electronic apparatuses are known in which a user touches an icon on the display unit, to perform a drag and drop operation, and thereby can move the icon.

However, in the above-described electronic apparatus, when a user is inexperienced in a touch operation of drag and drop, and depending on the state of a hand of a user and the apparatus, and so on, there may be a case that a user cannot perform an operation for moving an icon to a desired position. For example, when the crimp sensitivity in the display screen decreases in the middle of a moving operation of an icon by a user, the electronic apparatus judges that the touch operation by the user is interrupted, and thereby determines the display position of the icon against the user's will, irrespective of being in the middle of the icon moving operation.

DETAILED DESCRIPTION

Figure 1:
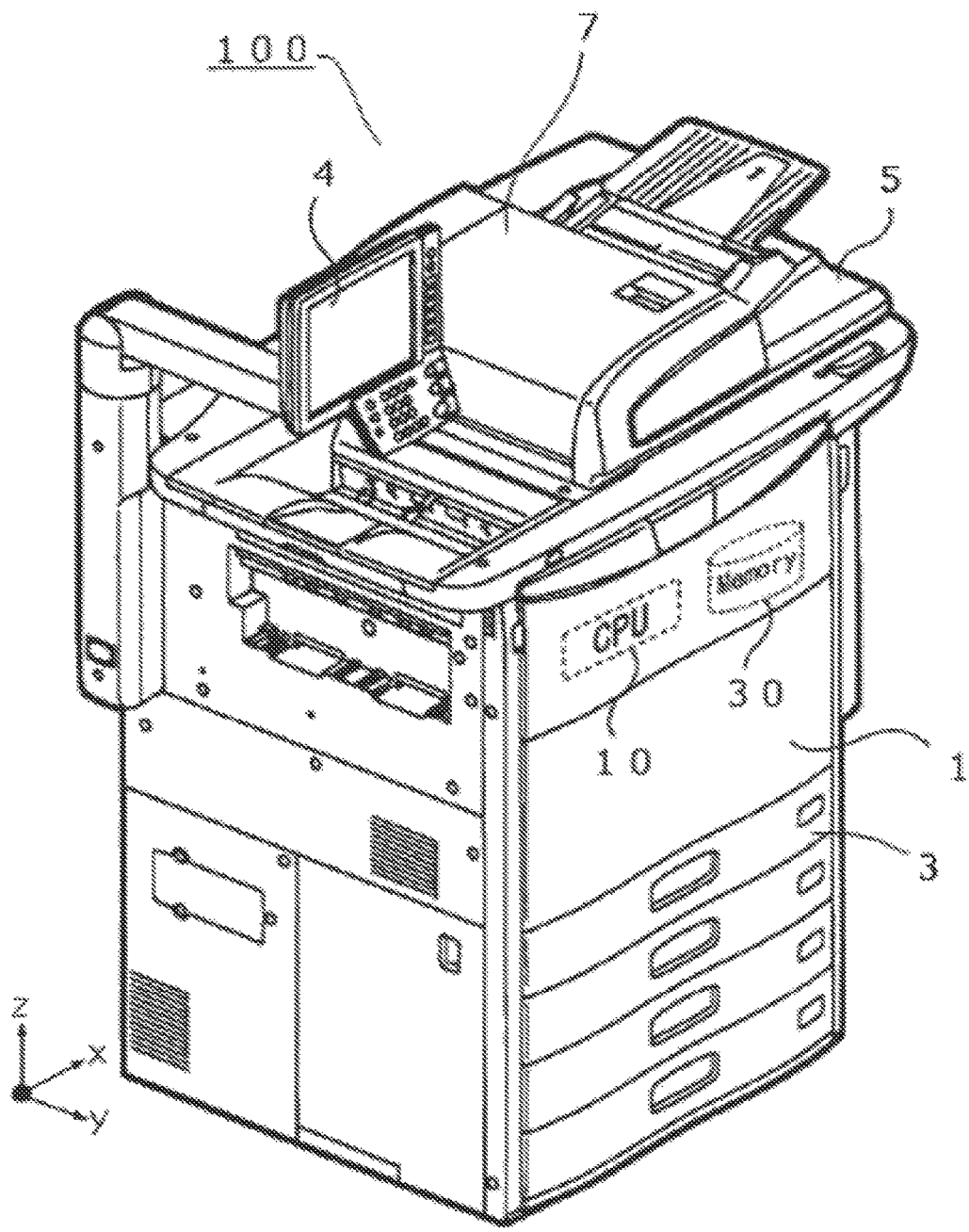
FIG. 1 is a view showing an appearance of an image processing apparatus according to a first embodiment.

According to one embodiment, an image processing apparatus has a display, a processor and a memory. The display displays a plurality of defined objects in a display screen. The defined object is assigned with a function of the apparatus by a user, and detects an operation of the user for selecting the relevant function. The processor executes an operation for the function assigned to the object which has detected the operation of the user, out of the objects. The memory stores display setting data for displaying the objects in the display screen. Further, in an edit mode for editing a display position of the defined object in the display screen, the processor makes the plurality of defined objects and a move button to be displayed on the display based on the display setting data. The move button detects an operation of a user for instructing exchange of display positions between a first defined object out of the plurality of defined objects and a second defined object to be displayed at a position close to the first defined object. The move button is displayed in the state that it is added to at least one defined object out of the first defined object and the second defined object. Further, when the processor judges that the operation of the user is detected by the move button, the processor changes the display setting data so that the display positions of the first defined object and the second defined object are exchanged.

Hereinafter, an image processing apparatus according to a first embodiment will be described. The image processing apparatus has, as its control mode, a selection mode which can select various functions of the apparatus, and an execution mode which can set the various functions and can instruct the execution of the various functions. In the selection mode, the image processing apparatus displays a plurality of object which are respectively assigned with various functions, and an edit button which is assigned with a display position edit function of the object, on a display device (refer to FIG. 5, for example). In the selection mode, when an object detects an operation of function selection by a user, the control mode of the image processing apparatus transfers from the selection mode to the execution mode. In the execution mode, the image processing apparatus becomes possible to execute the function which is assigned to the relevant object. Further, the image processing apparatus has an edit mode which can edit a display position of an object in the selection mode, as its control mode. In the above-described selection mode, when the edit button detects an operation of the edit function selection by a user, the control mode of the image processing apparatus transfers from the selection mode to the edit mode. In the edit mode, the image processing apparatus displays a move button which detects a movement instruction of the above-described object by a user, and so on, along with the above-described objects, on the display device (refer to FIG. 6, for example). The image processing apparatus detects the movement instruction of the user via the move button, to edit the display position of the object.

The image processing apparatus has a processor and a memory which will be described later, as means for editing a display position of an object. The memory stores display setting data for making the above-described object and the above-described move button and so on to be displayed on a display device. In the above-described edit mode, the processor makes the object added with the move button to be displayed in the display screen of the display device, based on the above-described display setting data (refer to FIG. 6). The move button detects an operation of a user for instructing to change a display position of an object. The processor changes the above-described display setting data, based on the operation of the user which the move button has detected, to edit the display position of the object. For example, the processor adds a move button to at least one of first and second objects that are a pair of objects with display positions adjacent to each other. Further, when the move button added to the above-described first object detects an operation of a user, for example, the processor edits the display setting data so that display positions of the above-described first object and the above-described second object are exchanged.

More specifically, the processor makes a plurality of objects which have mutually the same external shape to be displayed in a lattice-like arrangement on the display device, based on the above-described display setting data. The move button is added to a prescribed area (hereinafter, a first prescribed area) close to the adjacent object, in at least one of the first and the second objects.

Hereinafter, a first embodiment will be described with reference to the drawings. In the drawings, the same symbols indicate the same or similar portions. FIG. 1 is a perspective view showing an appearance of an image processing apparatus 100 according to a first embodiment.

The image processing apparatus 100 is a digital multifunction copy machine of a multifunction integral type (Multi Function Printer: MFP). Specifically, the image processing apparatus 100 has a scan function, a print function, and a copy function and so on. Further, the image processing apparatus 100 has a function to perform data transfer of image data read using the scan function, such as a function of a facsimile or mail transmission, for example.

The image processing apparatus 100 has an image forming unit 1 of a so-called quadruple tandem system, as the print function and the copy function, in order to form a color image using toners of four colors of C (cyan), M (magenta), Y (yellow), K (black), for example.

As shown in FIG. 1, the image processing apparatus 100 has the image forming unit 1 and a sheet feeding unit 3, in order to execute the print function and the copy function. The image forming unit 1 is provided at about a central portion of the image processing apparatus 100 main body. The image forming unit 1 forms a color image on a sheet, based on image information obtained through a scanner 5 or a network I/F (Interface) 80 described later. The sheet feeding unit 3 is provided below the image forming unit 1. The sheet feeding unit 3 has four sheet feeding cassettes for housing sheets of optional sizes, for example. The sheet feeding unit 3 takes out a sheet from the sheet feeding cassette and feeds the sheet to the image forming unit 1. Further, the image processing apparatus 100 has the scanner 5 so as to execute the scan function, the copy function, and the data transfer function. The scanner 5 has a document table and an image information read position, so as to read image information which a document holds. The document table supports a document loaded by a user. The image information read position is located in the middle of a document conveying path of an automatic document feeder 7 described later. The scanner 5 reads image information from a document loaded on the document table, or a document which is automatically conveyed to the image information read position. The scanner 5 reads the image information, to take in the image information of the document as data. The image processing apparatus 100 further has the automatic document feeder 7. The automatic document feeder 7 is openably/closably provided on the document table of the scanner 5. The automatic document feeder 7 automatically and continuously conveys sheet-like documents to the image information read position of the scanner 5. Further, the automatic document feeder 7 automatically discharges the document after the image information has been read, from the image information read position to a discharge position.

Further, the image processing apparatus 100 has an operation unit 4. The operation unit 4 has a function as input means and a function as display means. Specifically, the operation unit 4 detects an operation input of a user via a touch panel display 40 or an operation panel 41 described later. The operation input of a user includes an input for selecting the above-described function (scan function, for example), an input for instructing an execution start, and an input for instructing other necessary matters. The operation unit 4 outputs various request signals to a processor 10 described later, in accordance with the detected operation input of the user. Further, the operation unit 4 displays various information relating to the function and so on selected by a user.

The operation unit 4 is fitted to the image processing apparatus 100 main body, movably at a position above the document table of the scanner 5, via a rotatable and bendable arm member.

Figure 2:
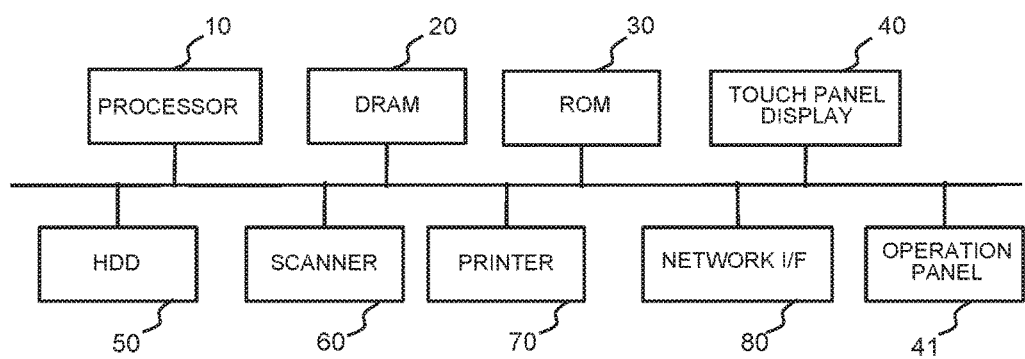
FIG. 2 is a block diagram showing a hardware configuration of the image processing apparatus according to the first embodiment.
Figure 3:
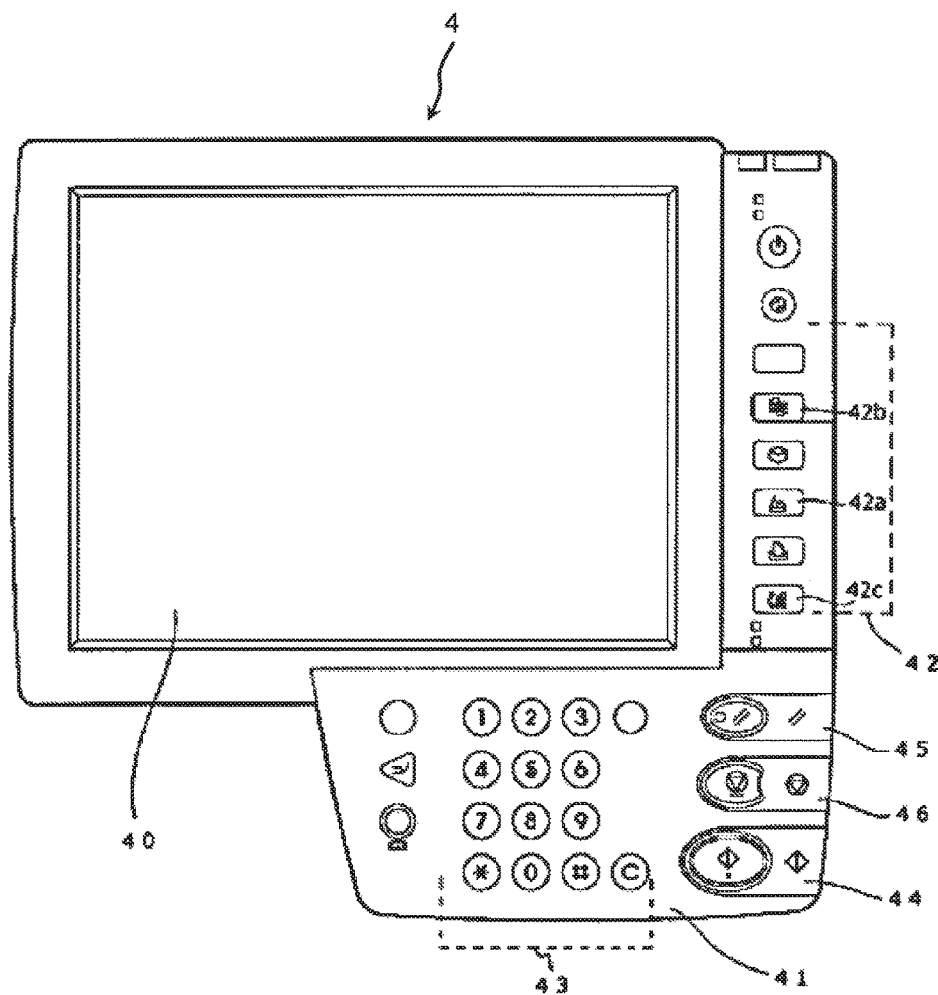
FIG. 3 is a view showing the operation unit of the image processing apparatus according to the first embodiment.

The operation unit 4 has the touch panel display 40 and the operation panel 41 which are shown in FIG. 2 and FIG. 3. The details of the touch panel display 40 and the operation panel 41 will be described later.

Hereinafter, a hardware configuration inside the image processing apparatus 100 will be described with reference to FIG. 2. FIG. 2 is a block diagram showing an example of a hardware configuration inside the image processing apparatus 100. As shown in FIG. 2, the image processing apparatus 100 has the processor 10 and memories. The memories have a DRAM (Dynamic Random Access Memory) 20, a ROM (Read Only Memory) 30, and an HDD (Hard Disk Drive) 50. Further, the image processing apparatus 100 has the network I/F (interface) 80. The processor 10 and the memories 20, 30, 50 connect to the touch panel display 40, the operation panel 41, a scanner 60, a printer 70, and the network I/F 80, via a communication bus. The above-described respective units such as the processor 10 perform transmission/reception of a control signal and data with each other, via a communication bus. The scanner 60 includes the above-described scanner 5 and automatic document feeder 7, for example. The printer 70 includes the above-described image forming unit 1 and sheet feeding unit 3, for example.

The processor 10 is a computer including a CPU (Central Processing Unit), for example. The processor 10 executes a plurality of instructions which are stored in the memories 30, 50 and the computer can execute, in order to control operations of the above-described various functions. Specifically, the processor 10 loads the programs stored in the ROM 30 and the HDD 50 in the DRAM 20, and executes the programs. The program includes a plurality of the above-described instructions. The processor 10 executes the programs, to control the operations of the above-described various functions. The DRAM 20 is a volatile main memory device. The DRAM 20 temporarily stores the program and the above-described display setting data and so on, when the processor 10 controls the operations of the above-described various functions. The ROM 30 is a non-volatile read only memory device which stores data permanently. The ROM 30 stores BIOS (Basic Input Output System) and so on, for the control at the time of the startup of the image processing apparatus 100.

The HDD 50 is a permanently storable non-volatile auxiliary memory device. The HDD 50 stores data and a program which a user uses. More specifically, the HDD 50 stores setting data for each user who uses the image processing apparatus 100, as a user database. The setting data for each user includes the above-described display setting data for making the above-described object and so on to be displayed on a display device.

The touch panel display 40 of the operation unit 4 has functions as display means and input means. The touch panel display 40 has an image display area where an icon is displayed. As will be described later, a user touches an object, and thereby can perform the selection of various functions and various settings and so on, of the image processing apparatus 100.

The touch panel display 40 has an input portion of an electrostatic capacitance system touch panel, and a display potion of a flat type panel. The electrostatic capacitance system touch panel detects a plurality of simultaneous contacts caused by a finger of a user and so on, so as to deal with multi-touch. The electrostatic capacitance system touch panel detects the contact, to obtain a coordinate value (an X value, a Y value) in accordance with the contact position. The flat type panel is provided with light emitting elements for display all over the panel surface. Accordingly, the whole surface of the touch panel display 40 forms the image display area.

In the above-described selection mode, the touch panel display 40 displays a selection operation screen described later which includes objects and an edit button, in the image display area. The objects and the edit button are displayed at display positions (prescribed coordinate positions) which are previously defined in the image display area. Specifically, the processor 10 reads out the above-described display setting data from the HDD 50, for example, in order to display a selection operation screen. The processor 10 makes the selection operation screen to be displayed on the touch panel display 40, based on this read display setting data. The objects include an object indicating a previously assigned function. Hereinafter, the object may be simply called an icon. An icon functions as a short cut button for selecting the assigned function. Specifically, an icon detects an operation input for selecting a function by a user. When an icon detects an operation input of the function selection by a user, the above-described control mode of the image processing apparatus 100 transfers from the selection mode to the above-described execution mode. In the above-described execution mode, the touch panel display 40 displays a setting operation screen not shown relating to the function (copy, scan, facsimile, for example) assigned to the relevant icon. Further, when a start key 44 described later or a start key contained in the setting operation screen detects an operation of a user, for example, the processor 10 executes an operation of the function assigned to the above-described icon.

The operation panel 41 of the operation unit 4 has mainly a function as an operation input unit. The operation panel 41 has various hardware buttons which will be described later.

The network I/F 80 is a unit which assumes communication with an external device. When the image processing apparatus 100 executes a printer function, the network I/F 80 obtains data of image information to be printed. The network I/F 80 includes a LAN (Local Area Network) board. Further, the network I/F 80 has a device pursuant to the short-range radio communication standards, and a connector pursuant to the USB (Universal Serial Bus) standards.

Hereinafter, the operation unit 4 will be described with reference to FIG. 3. FIG. 3 is an appearance view showing a whole configuration of the operation unit 4 including the above-described touch panel display 40 and the operation panel 41.

As described above, the operation unit 4 has the touch panel display 40 and the operation panel 41. As shown in FIG. 3, the operation panel 41 has various hardware keys such as a function setting key 42, a numerical keypad 43, a start key 44, a reset key 45, and a stop key 46, in order to assume a function as input means.

The touch panel display 40 is a liquid crystal display device which incorporates the above-described touch panel. The touch panel display 40 displays various operation screens which can detect an operation input of a user by the touch panel. The operation screens include a selection operation screen, a setting operation screen, and an edit operation screen, for example. The selection operation screen (refer to FIG. 5, for example) includes a plurality of icons assigned with various functions of the image processing apparatus 100, and an edit button. The edit button detects an operation input by a user for editing a display position of an icon. The setting operation screen (not shown) is a screen for setting the detailed condition necessary for the execution of various functions, and for a start instruction of the function execution, for example. The setting operation screen includes various buttons each of which detects an operation input by a user for setting the above-described detailed condition, and a start key to detect an operation input by a user for a start instruction of the function execution, and so on. The setting operation screen includes an operation screen for the copy function, an operation screen for the scan function, and an operation screen for the facsimile function, for example. The edit operation screen (refer to FIG. 6, for example) is an operation screen for editing a display position of an icon and so on in the above-described selection operation screen. The image processing apparatus 100 becomes in the above-described selection mode capable of selecting the various functions, in the state in which operations of the various functions are executable. In the selection mode, the touch panel display 40 displays the above-described selection operation screen. When an icon of the selection operation screen detects the selection of a function by a user, the control mode of the image processing apparatus 100 transfers from the selection mode to the above-described execution mode. In the execution mode, the touch panel display 40 displays the above-described setting operation screen relating to the function selected by the user. Further, when the edit button of the above-described selection operation screen detects an input by a user for the above-described editing, the control mode of the image processing apparatus 100 transfers from the selectin mode to the above-described edit mode. In the edit mode, the touch panel display 40 displays the above-described edit operation screen. The details of the selection operation screen and the edit operation screen will be described later.

The function setting key 42 is a hardware key which detects an operation for selecting various functions by a user. Accordingly, a user can select various functions of the image processing apparatus 100, using the icons of the above-described selection operation screen and this function setting key 42. As shown in FIG. 3, the function setting key 42 includes a scan function selection key 42a, a copy function selection key 42b, and a FAX function selection key 42c and so on. The scan function selection key 42a detects an operation input for selecting the scan function by a user. The copy function selection key 42b detects an operation input for selecting the copy function by a user. The FAX function selection key 42c detects an operation input for selecting the facsimile function by a user.

The numerical keypad 43 is a hardware key which detects an input of a numeric character or the like by a user. For example, the numerical keypad 43 detects an input by a user, regarding such as the number of copies, a department code, a facsimile number, user identification information (a user ID, a password, a mail address and so on).

The start key 44 is a hardware key for detecting an instruction of an operation start by a user, with respect to the above-described selected function. For example, when the copy function selection key 42b detects an operation of the copy function selection by a user, and then the start key 44 detects an instruction of the operation start by the user, the image processing apparatus 100 starts an operation of the copy function.

The reset key 45 is a hardware key which detects an instruction to reset (destruction of the set data or initialization, or the like) the previously set data by a user. For example, when the reset key 45 detects pushing down of the key (reset instruction) by a user, the image processing apparatus 100 resets the set data such as the number of copies which has been set by the user, via the operation screen for the copy function or the numerical keypad 43, for example.

The stop key 46 is a hardware key which detects an interruption instruction by a user against the operation which the image processing apparatus 100 is executing. For example, while the image processing apparatus 100 is executing an operation of the copy function, the stop key detects pushing down of the key (instruction to interrupt the operation) by a user, the image processing apparatus 100 interrupts the operation of the copy function during execution.

Further, the operation panel 41 shown in FIG. 3 has, in addition to the above-described various keys, a help key, a setting/registration key, a template key, an interruption key, a status confirmation key, a key button, a power saving key, an on-hook/pause key, a clear key, and an alarm display, and so on. The help key detects a display instruction of the user guide by a user. The setting/registration key detects an execution instruction of the setting or registration by a user. The template key detects a selection of a template as the previously registered data by a user. The interruption key detects an operation for request an interruption of the operation by a user. The status confirmation key detects an operation for requesting a status confirmation of the apparatus by a user. The key button detects an operation for requesting a security setting by a user. The power saving key detects an instruction for switching between a power saving mode to reduce power consumption and a normal operation mode by a user. The on-hook/pause key detects an instruction for causing the apparatus to be in an on-hook state as a telephone function by a user. The clear key detects a clear instruction of a numeric character or the like inputted by the above-described numerical keypad or the like by a user. The alarm display informs an abnormality of the apparatus.

Hereinafter, a general operation of the image processing apparatus 100 will be described. When a main power source of the image processing apparatus 100 is turned ON, the processor 10 reads out the fundamental program such as BIOS and various data from the ROM 30, and temporarily stores them in the DRAM 20. The processor 10 executes instructions contained in the program, using the various read data, to perform an operation for start-up. After the operation for start-up, the processor 10 makes a user authentication screen not shown to be displayed on the touch panel display 40, for example. The processor 10 acquires user identification data (hereinafter called a user ID) which is inputted by a user via the user authentication screen. When acquiring the user ID, the processor 10 sets the control mode of the image processing apparatus 100 to the above-described selection mode. In this selection mode, the processor 10 reads out the above-described display setting data which is associated with the user ID from the user database of the HDD 50. The processor 10 temporarily stores this read display setting data in the DRAM 20. The processor 10 makes a selection operation screen 401 (refer to FIG. 5) including icons and so on to be displayed in the image display area of the touch panel display 40, based on this read display setting data, and then enters a standby state.

The processor 10 keeps the standby state, till it receives various request signals. The various request signals include a request signal outputted from the operation unit 4, in accordance with the above-described operation input of a user, for example. The various request signals include a request signal and so on in response to the facsimile reception by the facsimile function, for example. When having received the request signal, the processor 10 controls the respective units so as to perform an operation in accordance with the relevant request signal. The operation according to the request signal includes copy, facsimile, and various setting processing including the editing of a display position of an icon and so on in the above-described edit mode, and so on. When the main power source of the image processing apparatus 100 is turned OFF, the processor 10 stores the various setting data and so on which will become necessary at the time of next start-up in the HDD 50, and finishes the operation of the whole apparatus. The various necessary setting data includes the above-described display setting data in which a display position of an icon and so on have been edited in the edit mode.

Figure 4:
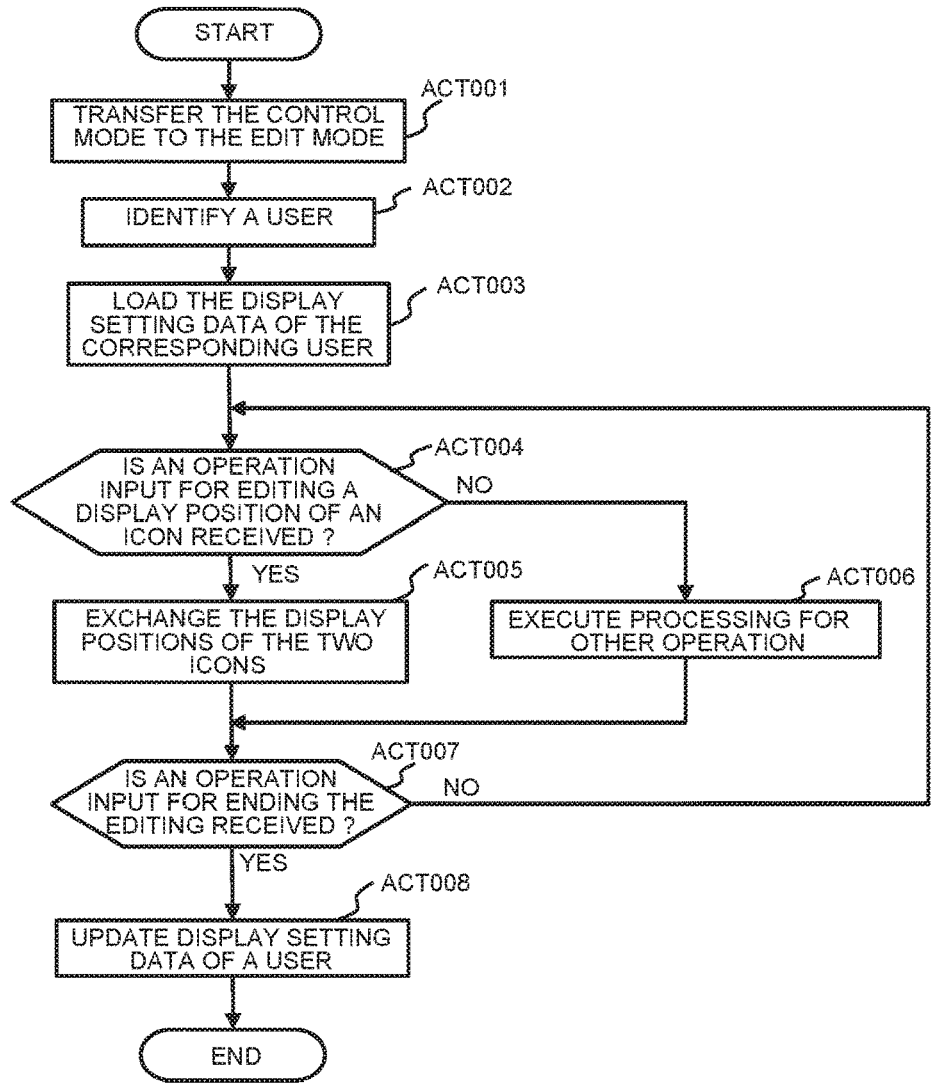
FIG. 4 is a flow chart showing an operation in an edit mode of the image processing apparatus according to the first embodiment.

Hereinafter, an operation of the image processing apparatus 100 in the above-described edit mode will be described with reference to FIG. 4 to FIG. 6. FIG. 4 is a flow chart showing an operation of the image processing apparatus 100 in the above-described edit mode.

In order to realize the operation shown in FIG. 4, the processor 10 loads the program previously stored in the HDD 50 in the DRAM 20. The processor 10 executes the program codes contained in this program, that is, the instructions contained in the program. Further, the processor 10 cooperates with other hardware such as the touch panel display 40, to perform the operation shown in FIG. 4. Accordingly, the processor 10, the HDD 50, the DRAM 20 and the touch panel display 40 and so on function, as edit means to edit a display position of an icon in the edit mode.

Specifically, the processor 10 makes the selection operation screen 401 to be displayed on the touch panel display 40 in the above-described selection mode, in accordance with the above-described display setting data. FIG. 5 is a view showing the selection operation screen 401 which the image processing apparatus 100 displays. As shown in FIG. 5, the selection operation screen 401 includes icons 402 and an edit button 403. The processor 10 waits till an operation of a user is detected by the icon 402 or the edit button 403. When the edit button 403 detects an operation of a user, in ACT001, as shown in FIG. 4, the processor 10 makes the control mode of the image processing apparatus 100 transfer from the selection mode to the edit mode. As described above, the edit mode is a control mode for editing a display position and so on of an icon of the selection operation screen 401.

When the control mode of the image processing apparatus 100 is transferred to the edit mode, the operation of the image processing apparatus 100 proceeds to ACT002. In ACT002, the processor 10 identifies a user who is trying to edit a display position and so on of an icon, based on a user ID. When the processor 10 identifies the user, the operation of the image processing apparatus 100 proceeds to ACT003. In ACT003, the processor 10 makes an edit operation screen 404 including icons to be displayed on the touch panel display 40, based on the above-described display setting data associated with the user ID. FIG. 6 is a view showing the edit operation screen 404 which the image processing apparatus 100 displays. The above-described display setting data is read out from the HDD 50, and is stored in the DRAM 20.

In order to identify a user in the above-described ACT002, the processor 10 makes a user authentication screen not shown to prompt an input of a user ID and a password to be displayed on the touch panel display 40. The processor 10 collates the user ID and the password inputted by the user with the user ID and the password which have been previously stored. The processor 10 performs identification of the user by this collation.

A user operates the hardware button such as the numerical keypad 43, or touches a button of such as the numeral character contained in the above-described user authentication screen, and thereby can input the above-described user ID and password. Further, when the image processing apparatus 100 has a card reader not shown, a user brings a magnetic card or an IC card in which the above-described user ID and password have been recorded close to the card reader, and thereby can input the user ID and the password.

Since the above-described user identification is also performed, prior to the transfer to the above-described edit mode, after the operation for start-up of the image processing apparatus 100, as described above, it is possible to omit the operation of the above-described ACT002. In the present embodiment, in order that the processor 10 permits an operation specific to a user, called editing of a display position and so on of an icon of the selection operation screen 401, the processor 10 daringly performs the identification of a user, also in the above-described ACT002.

Hereinafter, the selection operation screen 401 and the edit operation screen 404 will be described more in detail with reference to FIG. 5 and FIG. 6. As shown in FIG. 5, the image processing apparatus 100 displays the selection operation screen 401 on the touch panel display 40. The processor 10 makes the selection operation screen 401 shown in FIG. 5 to be displayed on the touch panel display 40, in the selection mode before transferring to the edit mode. As shown in FIG. 6, the image processing apparatus 100 displays the edit operation screen 404 on the touch panel display 40. The processor 10 makes the edit operation screen 404 shown in FIG. 6 to be displayed on the touch panel display 40, when the control mode is transferred to the edit mode (at the time of edit start). The selection operation screen 401 and the edit operation screen 404 include a user name display area 406 to display the user ID of the above-described identified user. In each of the user name display areas 406 of the selection operation screen 401 and the edit operation screen 404 shown in FIG. 5 and FIG. 6, "User-1" is displayed as the user ID. In other words, the selection operation screen 401 and the edit operation screen 404 shown in FIG. 5 and FIG. 6 are respectively a selection operation screen and an edit operation screen of the user identified based on the user ID "User-1". The selection operation screen 401 and the edit operation screen 404 include the icons 402 as described above.

Figure 5:
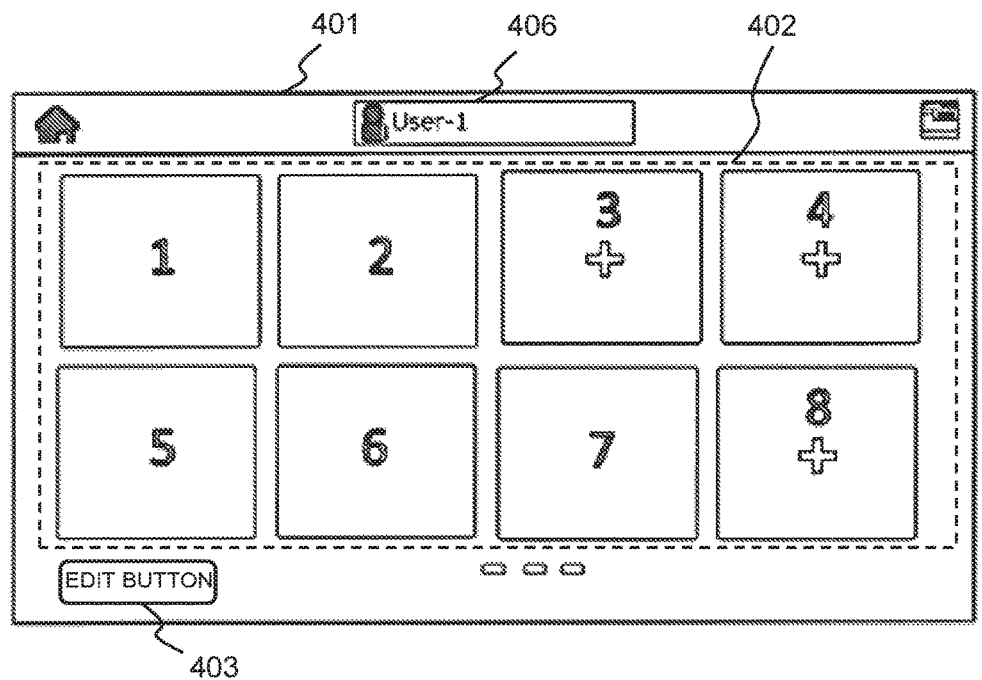
FIG. 5 is a view showing a selection operation screen which the image processing apparatus according to the first embodiment displays.
Figure 6:
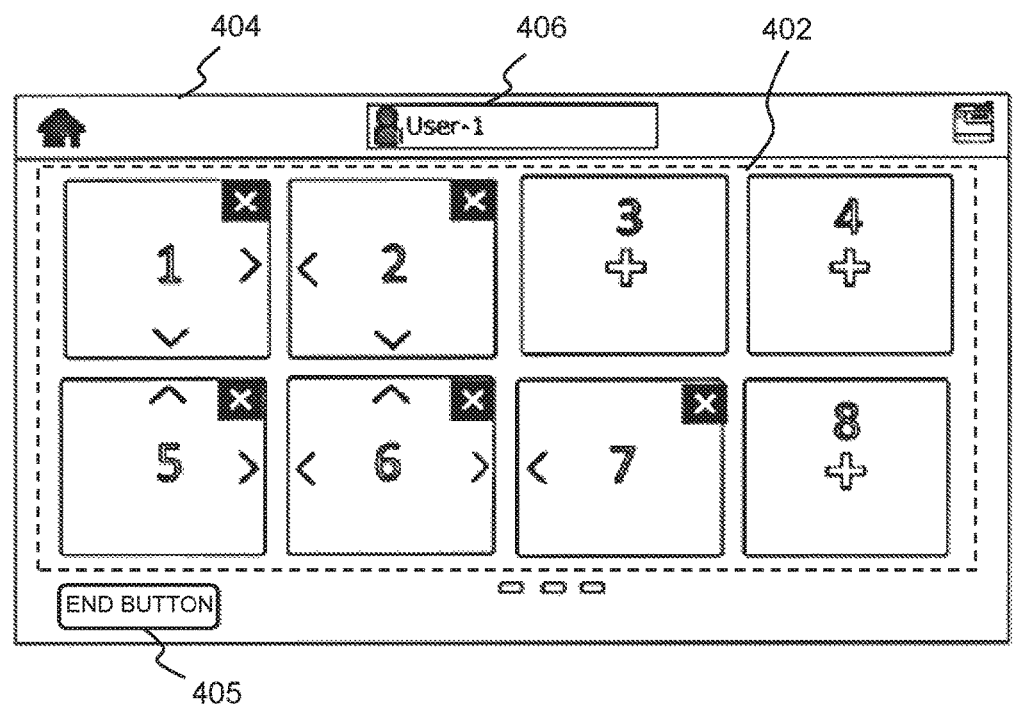
FIG. 6 is a view showing an edit operation screen which the image processing apparatus according to the first embodiment displays.

As shown in FIG. 5 and FIG. 6, the touch panel display 40 displays the eight icons 402 each assigned with a function of the apparatus in an array of 4 (horizontal) X 2 (vertical). The array and number of the icons 402 are not limited to those of FIG. 5 and FIG. 6.

In FIG. 5 and FIG. 6, in order to simplify the description, numbers "1-8" are given to the respective icons 402. In contrast, each icon 402 is actually displayed in the state that a character string (for example, "COPY", "FAX", "SCAN", and so on) indicating a function of the image processing apparatus 100, or an image such as a figure indicating the relevant function is added to the icon 402.

In FIG. 5 and FIG. 6, the icons 402 displayed on the touch panel display 40 are classified roughly into two kinds of an icon assigned with a function of the apparatus, and an icon not assigned with a function thereof. In the following description, the icon assigned with a function is called a defined icon (defined object). Further, the icon not assigned with a function is called an undefined icon (undefined object).

As shown in FIG. 5 and FIG. 6, the touch panel display 40 displays the undefined icons "3","4","8", in the state that a character string or an image by a symbol (for example, an index of a "+" symbol) indicating that a function is not assigned is added to the center of the undefined icon. Further, the touch panel display 40 displays the undefined icons "3","4","8" collectively in an predetermined area at one side (for example, a right side area in FIG. 6) of each of the selection operation screen 401 and the edit operation screen 404.

Further, the processor 10 prohibits an edit (movement) of a display position of an undefined icon in the edit operation screen 404, till a function is assigned to the undefined icon. The processor 10 executes the instructions of the above-described program, to prohibit the edit of a display position of an undefined icon. The edit of a display position of an undefined icon is prohibited, and thereby the degree of freedom of a display position of a defined icon can be ensured as much as possible.

Hereinafter, the assignment of a function to an undefined icon in the edit mode will be described. When an undefined icon (for example, the icon "3") in the edit operation screen 404 during the edit mode detects a selection operation (touch operation) by a user, the processor 10 switches the screen of the touch panel display 40 to a list display screen not shown for displaying a list of assignable functions. When the list screen not shown detects a prescribed operation of a user for the function selection, the processor 10 assigns a function to the relevant undefined icon (for example, the icon "3"). Accordingly, the user selects a specific function from the above-described list display screen, and thereby the specific function is assigned to the undefined icon. In other words, the specific function is made to correspond to the undefined icon.

On the other hand, the touch panel display 40 displays the defined icons "1","2","5"-"7", in the state that a release button is added to a prescribed area (for example, an upper right side area of the icon in FIG. 6) of each of the defined icons in the edit operation screen 404. This prescribed area is an area different from the above-described first prescribed area, and hereinafter called a second prescribed area. The release button is a software button (switch) which detects an instruction operation of a user for releasing the assignment of a function to an icon. An index of an "X" symbol, for example, indicating the function release is written in the release button. Further, the touch panel display 40 displays a defined icon with a move button added to the above-described first prescribed area of the defined icon. The move button is a software button (switch) which detects an instruction operation of a user, for moving display positions between two defined icons in the edit operation screen 404. An index of an arrow head symbol ("<", "\/" and so on), for example, indicating a movable direction of an icon is written in a move button.

Hereinafter, the release of function assignment to a defined icon in the edit mode will be described. When a release button of a defined icon in the edit operation screen 404 during the edit mode detects an instruction operation (touch operation) by a user, the processor 10 releases the assignment of the function to the relevant icon. The icon in which the assignment of the function is released becomes an undefined icon. The processor 10 makes the relevant icon to be displayed on the touch panel display 40 as an undefined icon. Specifically, the touch panel display 40 adds an index of the above-described "+" symbol to the relevant icon, erases the move button and the release button from the relevant icon, and then displays the relevant icon in the edit operation screen 404. Further, the touch panel display 40 moves a display position of the relevant icon in the edit operation screen 404 to above-described predetermined area at the one side in the edit operation screen 404, if necessary.

For example, when the release button of the defined icon "7" of FIG. 6 detects an instruction operation of a user, the processor 10 makes the icon "7" to be displayed on the touch panel display 40 as an undefined icon. The touch panel display 40 adds an index of the above-described "+" symbol to the icon "7", erases the move button and the release button from the relevant icon, and then displays the icon "7" in the edit operation screen 404. The display position of an undefined icon is previously set as described above. That is, the undefined icons are displayed collectively in the area at the one side of the edit operation screen 404. In contrast, the icon "7" is originally displayed in the area at the one side of the edit operation screen 404, it is not necessary to change the display position of the icon "7". Accordingly, the touch panel display 40 displays the icon "7" without changing the display position of the icon "7".

In contrast, when the release button of the icon "1" of FIG. 6 detects an instruction operation of a user, the processor 10 makes the icon "1" to be displayed on the touch panel display 40 as an undefined icon. The touch panel display 40 adds an index of the above-described "+" symbol to the icon "1", erases the two move buttons and the release button from the relevant icon, and then displays the icon "1" in the edit operation screen 404. Further, the touch panel display 40 moves the display position of the icon "1" to above-described predetermined area at the one side in the edit operation screen 404. Specifically, the touch panel display 40 changes the position of the icon "1" to the display position of the icon "7". In accordance with the change of the display position of the icon "1", the touch panel display 40 moves the display positions of the other defined icons. For example, the touch panel display 40 moves the other whole defined icons "2", "5"-"7" in the edit operation screen 404, such that they are sequentially moved up in accordance with the numbers of the defined icons. That is, in FIG. 6, the icon "2" moves to the left, the icon "5" moves to the upper right, the icons "6", "7" move to the left side one by one. But the moving form of the icons is not limited to the above-described form. For example, when the release button of the icon "1" detects an instruction operation of a user in the same manner as described above, the touch panel display 40 exchanges and displays the display positions of the icon "7" and the icon "1", and does not have to change the display positions of the other icons "2","5","6". The processor 10 executes the above-described instructions, to control the moving form of the display positions of the above-described icons on the touch panel display 40.

Hereinafter, the editing of a display position of an icon, based on an instruction operation of a user will be described. In the present embodiment, the edit of the display position of an icon means the change of display positions between a pair of icons, that is, between two icons. In order to change display positions between two icons, the icons are displayed in the state that one move button is added to each of the pair of icons whose display positions can be changed.

For example, in FIG. 6, the icon "2" can exchange and move its display position with the icon "1" adjacent to the left side thereof. Accordingly, in order to enable the exchange of the display positions between the icon "2" and the icon "1", move buttons are displayed in the state that they are respectively added to the icon "2" and the icon "1". Specifically, the move button of the icon "2" is displayed in the first prescribed area at the left side of the icon "2". In the move button displayed in the first prescribed area at the left side of the icon "2", an index of an arrow head symbol "<" indicating that it is movable to the left side is written.

The move button of the icon "1" is displayed in the first prescribed area at the right side of the icon "1". In the move button displayed in the first prescribed area at the right side of the icon "1", an index of an arrow head symbol ">" indicating that it is movable to the right side is written. Further, the icon "2" can exchange the display position with the icon "6" adjacent to the lower side thereof.

Accordingly, in order to enable the exchange of the display positions between the icon "2" and the icon "6", move buttons are displayed in the state that they are respectively added to the icon "2" and the icon "6". In this case, the move button of the icon "2" is displayed in the first prescribed area at the lower side of the icon "2". In the move button displayed in the first prescribed area at the lower side of the icon "2", an index of an arrow head symbol "\/" indicating that it is movable to the lower side is written. The move button of the icon "6" is displayed in the first prescribed area at the upper side of the icon "6". In the move button displayed in the first prescribed area at the upper side of the icon "6", an index of an arrow head symbol "/\" indicating that it is movable to the upper side is written.

On the other hand, since the icon "3" adjacent to the right side of the icon "2" is an undefined icon, the movement of the display position is prohibited, as described above. Accordingly, the exchange of the display positions between the icon "2" and the icon "3" is impossible. Accordingly, a move button is not displayed in the first prescribed area at the right side of the icon "2". Further, since an adjacent icon is not present at the upper side of the icon "2", a move button is not also displayed in the first prescribed area at the upper side of the icon "2".

The above-described first prescribed areas in the icons where the move buttons for performing exchange of the display positions between the two icons are to be displayed are areas close to the both icons, respectively.

The touch panel display 40 displays the above-described move button and release button, only in the edit operation screen 404 in the above-described edit mode. Specifically, the edit operation screen 404 includes an end button 405 as described in FIG. 6. When the end button 405 detects an instruction operation of a user, the processor 10 makes the selection operation screen 401, after editing the display position and so on of the icon, to be displayed on the touch panel display 40. The touch panel display 40 displays the icon 402 without adding a move button and a release button to the above-described edited display position, in the selection operation screen 401.

Accordingly, even when a user touches the above-described first prescribed area in a defined icon or the above-described second prescribed area in a defined icon with a finger or the like, in the display screen other than the edit operation screen 404, the user cannot perform an operation of the edit and release and so on of a display position of an icon. For example, even when a user touches the above-described first prescribed area in a defined icon or the above-described second prescribed area in a defined icon with a finger or the like, in the selection operation screen 401 other than the edit operation screen 404, only the above-described setting operation screen is displayed on the touch panel display 40, as described above. The user can perform only operations of the condition setting for the function execution, and the instruction of execution start in the setting operation screen.

Conversely, in the edit operation screen 404 of the above-described edit mode, even when a user touches a central area in a defined icon, that is, an area other than the above-described first prescribed area and second prescribed area in a defined icon with a finger or the like, the user cannot perform an operation for executing the function assigned to the icon. That is, in the edit mode, even when an icon of the edit operation screen 404 detects a touch operation of a user, the processor 10 only allows the above-described editing of the icon, and does not perform an operation relating to the function assigned to the icon.

In the above-described ACT003, when the processor 10 makes the edit operation screen 404 to be displayed on the touch panel display 40, based on the above-described display setting data, the operation of the image processing apparatus 100 proceeds to ACT004. In ACT004, the processor 10 monitors the above-described request signal outputted from the operation unit 4 (the edit operation screen 404 and the operation panel 41) of the touch panel display 40, to stand by till an operation input by a user is received. When receiving the above-described request signal, the processor 10 determines whether or not the operation input from the user is an operation input for editing the display position of an icon. In other words, the processor 10 determines whether or not the edit operation screen 404 has detected the operation input from the user, based on the above-described request signal.

For example, judging that the edit operation screen 404 has detected the operation input from the user, the processor 10 recognizes a coordinate value indicating a touch operation position of the user which is detected by the edit operation screen 404. The processor 10 compares the coordinate value indicating the touch operation position of the user with a coordinate value indicating the above-described first prescribed position (a display position of the move button of the icon). The processor 10 judges whether the move button of the icon has detected the operation input of the user in the edit operation screen 404, based on this comparison result. When judging that the move button of the icon has detected the operation input of the user, the processor 10 determines that the above-described request signal is based on the detection of the operation input of the user by the move button. The processor 10 further determines what move button of what icon has detected the operation input of the user. When the processor 10 determines that the above-described request signal is based on the detection of the operation input of the user by the move button (YES in ACT004), the operation of the image processing apparatus 100 proceeds to ACT005.

In ACT005, the processor 10 controls the display of the touch panel display 40, so that the display positions of the relevant two icons in the movable direction corresponding to the move button which has detected the operation input of the user, are exchanged. Specifically, the processor 10, edits the above-described display setting data which is stored in the DRAM 20, in order to exchange the display positions of the two icons. The processor 10 exchanges the display positions of the relevant two icons in the edit operation screen 404, based on the edited display setting data, and makes them to be displayed on the touch panel display 40. The touch panel display 40 changes the display positions of the relevant pair of the icons, and displays the icons in the edit operation screen 404. When the processor 10 exchanges the display positions of the two icons, and makes the icons to be displayed on the touch panel display 40, the operation of the image processing apparatus 100 proceeds to ACT007.

On the other hand, in the above-described ACT004, when the processor 10 determines that the above-described request signal is not based on the detection of the operation input of the user by the move button (NO in ACT004), the operation the image processing apparatus 100 proceeds to ACT006. In ACT006, the processor 10 executes a processing for other operation in accordance with the content of the relevant request signal. The processing for the other operation includes releasing of the function of the above-described release button and so on, based on a user's selection, for example. When the processor 10 executes the processing for the above-described other operation, the operation the image processing apparatus 100 proceeds to ACT007.

In ACT007, the processor 10 judges whether or not an operation of a user is detected by the end button 405 in the edit operation screen 404. When the processor 10 judges that an operation of a user is not detected by the end button 405 (NO in ACT007), the operation of the image processing apparatus 100 returns to the above-described ACT004. Accordingly, the processor 10 repeats the processings from the above-described ACT004 to ACT006, till the operation of the user is detected by the end button 405 in the edit operation screen 404. On the other hand, when the processor 10 judges that the operation of the user is detected by the end button 405 (YES in ACT007), the operation of the image processing apparatus 100 proceeds to ACT008. In ACT008, the processor 10 returns the control mode of the image processing apparatus 100 from the edit mode to the selection mode, to finish a series of the processings in the edit mode. Specifically, when the above-described display setting data stored in the DRAM 20 has been edited as described above, the processor 10 makes the selection operation screen 401 to be displayed on the touch panel display 40, based on this edited display setting data. In other words, in the edit operation screen 404 of the edit mode, the touch panel display 40 switches the display screen to the edited selection operation screen 401. Further, the processor 10 stores the edited display setting data in the user data base of the HDD 50.

The above-described display setting data includes the following data, for example.
(1) The total number of icons to be displayed
(2) The numbers of vertical rows and horizontal columns of a place where respective icons are displayed
(3) A coordinate position where each icon is displayed
(4) A user ID for each icon
(5) Setting data to be associated with a user ID
(6) Data showing a rule to display an undefined icon The above-described setting data (5) further includes the following data, for example.
(5-1) Data indicating whether each icon is a defined icon or an undefined icon, and data indicating whether or not each icon is a specific icon described later
(5-2) Data indicating a function which is assigned to a defined icon
(5-3) A coordinate position of a release button in a defined icon (A coordinate position of the above-described second prescribed area)
(5-4) A coordinate position of a move button in a defined icon (A coordinate position of the above-described first prescribed area), and data indicating the kinds of move buttons The data indicating the kinds of move buttons in the above-described setting data (5-4) includes data indicating that the relevant move button is a move button for instructing an icon to move in what direction (a horizontal direction, a vertical direction, and an oblique direction, for example). The data indicating the kinds of move buttons further includes a coordinate position of a moving destination of an icon.

Further, the above-described data (6) is data which a user has selected regarding a rule to display an undefined icon.

When the processor 10 makes the selection operation screen 401 to be displayed on the touch panel display 40, the processor 10 makes icons to be displayed, in accordance with the above-described setting data (1) to (4), (5-1), (5-2) and (6).

When the processor 10 makes the edit operation screen 404 to be displayed on the touch panel display 40, the processor 10 makes icons to be displayed on the touch panel display 40, based on the setting data except the above-described data (5-2), for example, and makes a release button and a move button to be displayed.

When performing assignment of a function to an undefined icon, the processor 10 edits the above-described data (5) out of the above-described setting data, for example. The processor 10 makes icons to be displayed in the edit operation screen 404, in accordance with the above-described edited setting data, and makes a release button and a move button to be displayed.

When any release button detects an operation of a user, the processor 10 edits the above-described data (5) out of the above-described setting data, for example. The processor 10 makes icons to be displayed in the edit operation screen 404, in accordance with the above-described edited setting data, and makes a release button and a move button to be displayed.

When any move button detects an operation of a user, the processor 10 edits the above-described data (3), (5-1) and (5-2) out of the above-described setting data, for example. The processor 10 makes icons to be displayed in the edit operation screen 404, in accordance with the above-described edited setting data, and makes a release button and a move button to be displayed.

When an edit end button detects an operation of a user, for example, and the power source of the image processing apparatus 100 is turned OFF, the processor 10 stores the above-described edited setting data in the HDD 50. The above-described edited display setting data will be read out again at the time of next authentication of a user ID.

Figure 7:
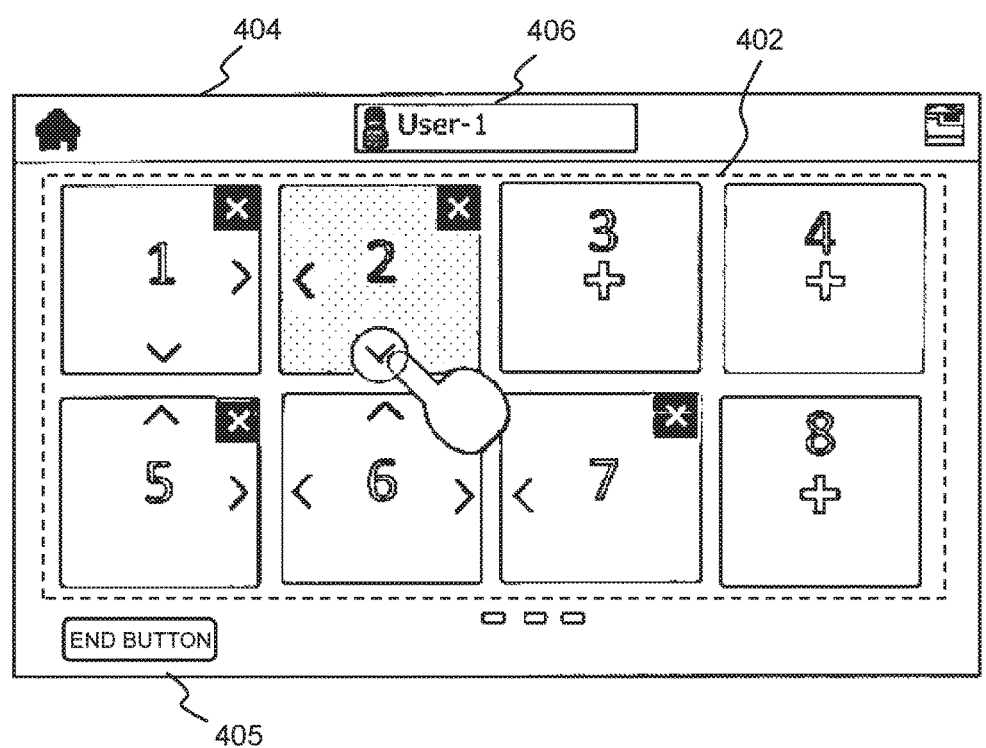
FIG. 7 is a view showing an operation example in the edit operation screen which the image processing apparatus according to the first embodiment displays.
Figure 8:
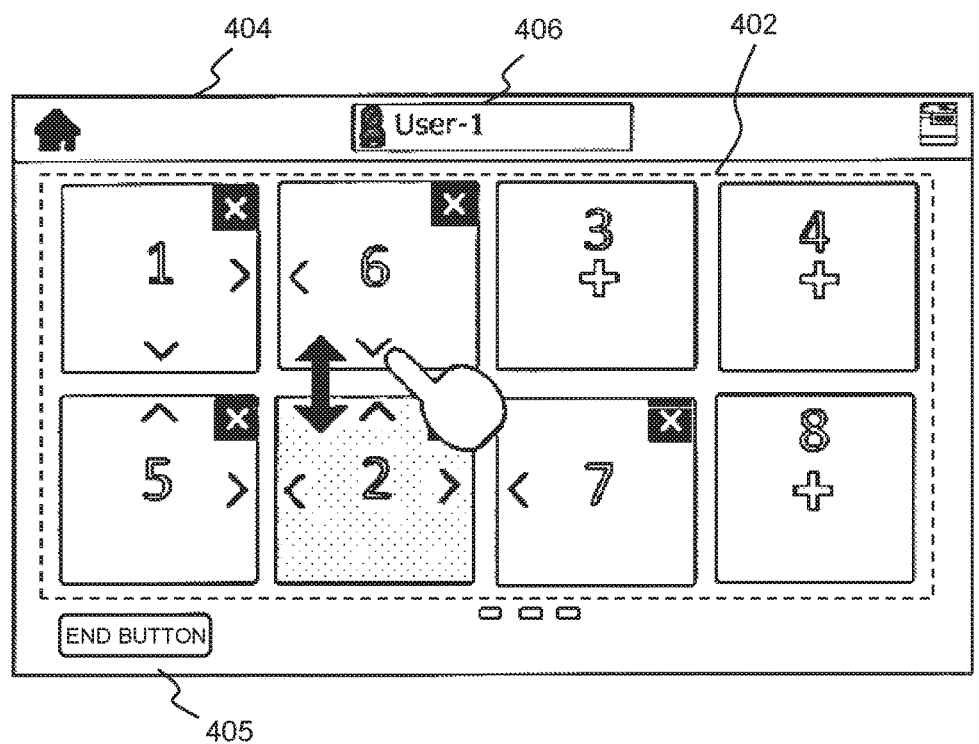
FIG. 8 is a view showing an operation example in the edit operation screen which the image processing apparatus according to the first embodiment displays.
Figure 9:
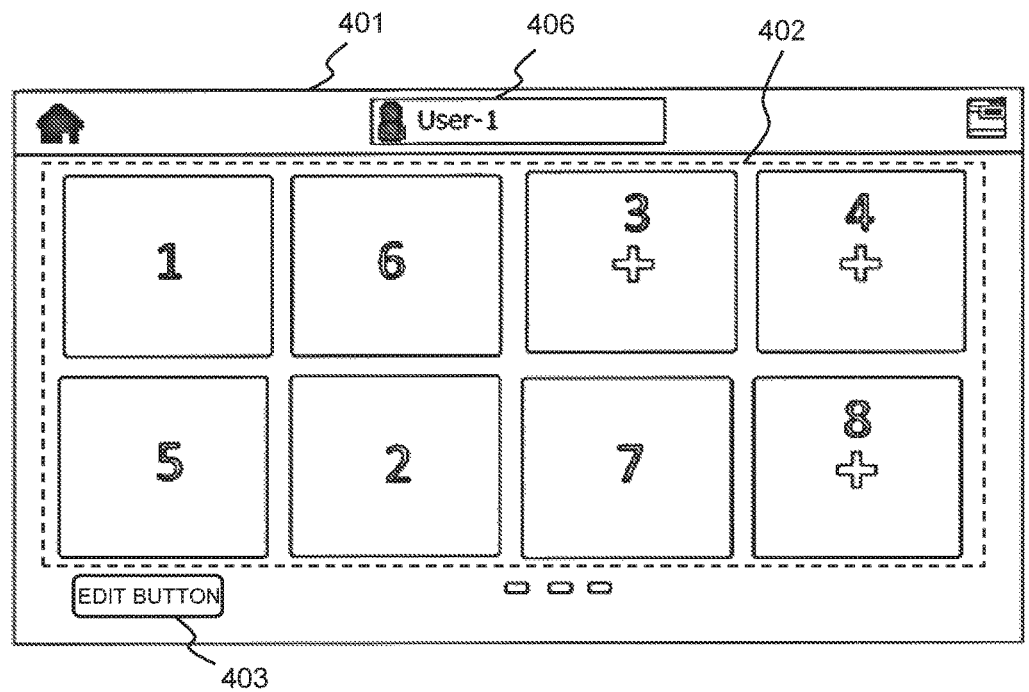
FIG. 9 is a view showing a selection operation screen after the editing is finished, which the image processing apparatus according to the first embodiment displays.

Hereinafter, an operation example of a move button by a user in the edit operation screen 404 will be described with reference to FIG. 7 to FIG. 9. FIG. 7 and FIG. 8 are views indicating an operation example in the case that a user performs an touch operation of a move button, to exchange display positions of two icons up and down in the drawing. As shown in FIG. 7, a user performs a touch operation with a finger to a move button which is displayed at the lower side of the icon "2" and in which a downward arrow head is written. When the above-described move button of the icon "2" detects this operation of the user, the display positions of icons are exchanged between the icon "2" and the icon "6" which is displayed at the lower side of the icon "2", as shown in FIG. 8. FIG. 9 is a view showing the selection operation screen 401 after the editing of the display positions of the icons is finished. When the edit mode is finished in the display state of the icons shown in FIG. 8, the selection operation screen 401 shown in FIG. 9 is displayed on the touch panel display 40.

As described above, a direction of an arrow head symbol written in a move button of the present embodiment indicates a movable direction of an icon. Accordingly, a user can also visually and easily recognize a moving direction of the icon by an operation of the move button.

Further, in the present embodiment, it is possible to exchange display positions of adjacent icons by one touch operation of a user, unlike a conventional drag and drop operation of a user. Accordingly, a user can easily and rapidly realize the change of display position of an icon.

In the above-described embodiment, the touch panel display 40 is a display of an electrostatic capacitance system, but it is not limited to this. The touch panel display 40 may be a display of other system such as a crimp type (a resistance film system).

In the above-described embodiment, a move button in which an index of an arrow (arrow head) symbol indicating a movable direction of an icon is written is added to any of the four first prescribed areas at upper and lower, and left and right end sides of an icon. But an index written in a move button is not limited to this. As another example, move buttons in which character strings such as "UP", "DOWN", "LEFT", "RIGHT" are written may be added to the four first prescribed areas of an icon, respectively, for example.

Figure 10:
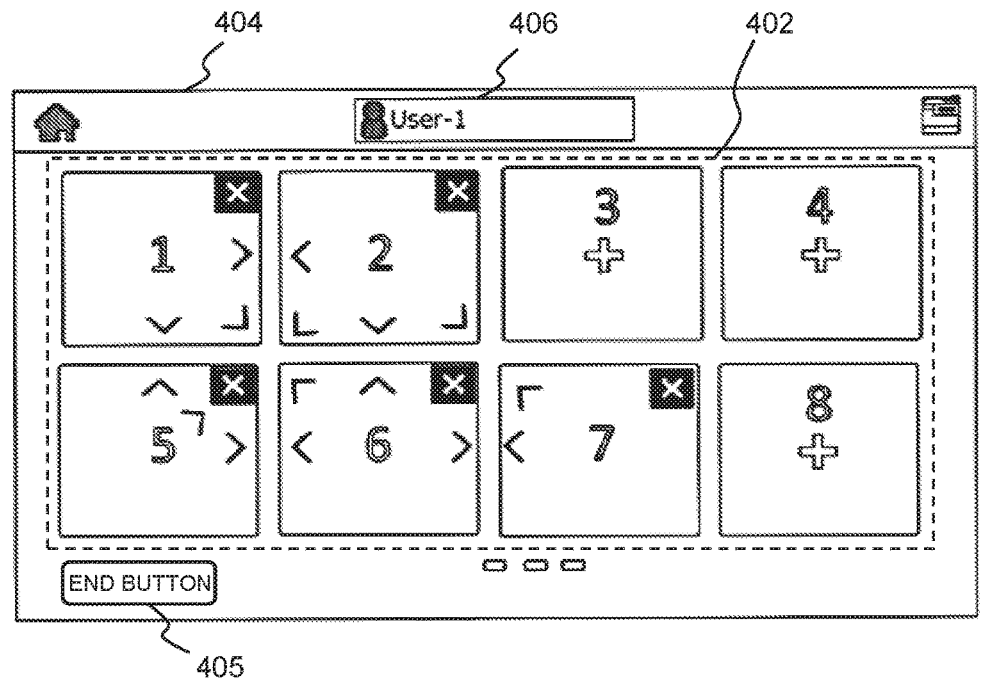
FIG. 10 is a view showing another display example of an edit operation screen which the image processing apparatus according to the first embodiment displays.

Further, the exchange of display positions of two icons is not limited to the above-described exchange of icons in the vertical and horizontal directions. For example, the exchange of display positions of two icons may be performed between two icons in the oblique direction. Hereinafter, the exchange of the display positions between two icons in the oblique direction will be described with reference to FIG. 10. FIG. 10 is a view showing a display example of the edit operation screen 404 including move buttons which can exchange display positions between two icons in the oblique direction. When display positions are exchanged between two icons in the oblique direction, icons are displayed in the state that a move button is added to the above-described first prescribed area at each corner portion of an icon, as shown in FIG. 10. In move buttons of FIG. 10, an index of an arrow head symbol indicating a movable direction such as "upper right", "lower right" is written, but a character string indicating a movable direction may be written therein, as described above.

Further, a move button for exchanging display positions between the icon "2" at the obliquely upper right side of the icon "5" and the icon "5" is added to the first prescribed area at the obliquely upper right side of the icon "5" of FIG. 10. Since this move button in the first prescribed area at the obliquely upper right side is added to a position close to the other move buttons and the release button, this may easily cause an operation mistake of a user. In such a case, a configuration is preferable in which the move button at the obliquely upper right side of the icon is "5" not displayed. Even with the configuration like this, a user touches the move button added to the first prescribed area at the obliquely lower left side of the icon "2", and thereby can exchange display positions of the icon "5" and the icon "2".

Figure 11:
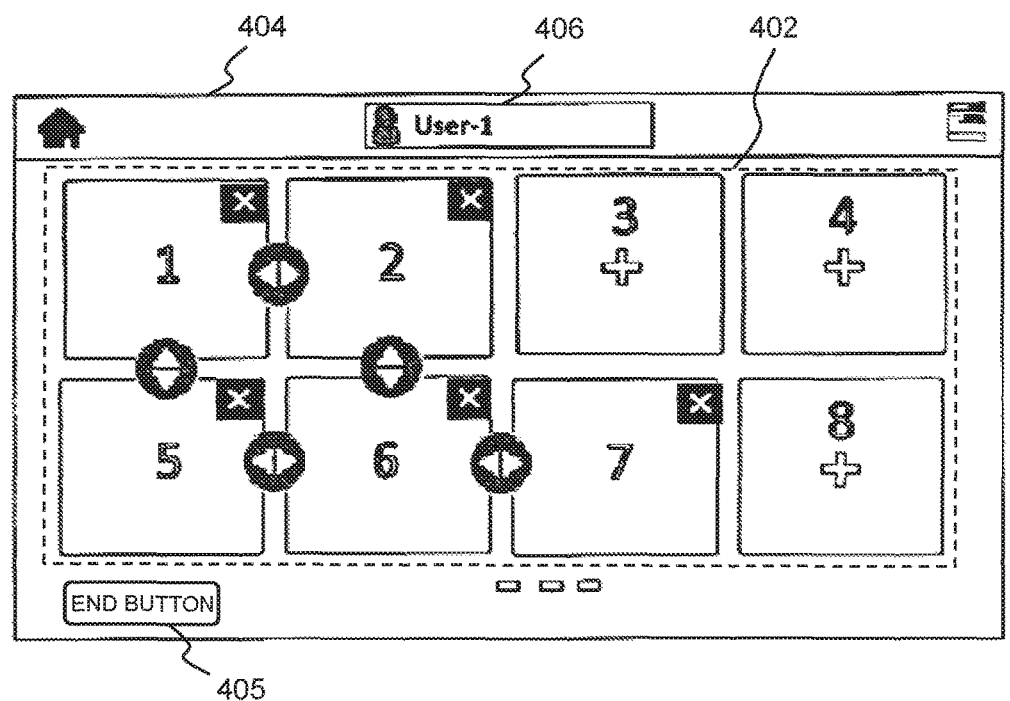
FIG. 11 is a view showing another display example of an edit operation screen which the image processing apparatus according to the first embodiment displays.

Further, in the above-described embodiment, move buttons are respectively added to a pair of icons capable of exchanging display positions thereof, but a move button may be added only to any one icon. Further, a move button may be displayed across between two icons. An edit operation screen in the case that a move button is added across between two icons will be described with reference to FIG. 11. FIG. 11 is a view showing a display example of the edit operation screen 404 including a move button which is added across between two icons. As shown in FIG. 11, a move button is added across between the respective first prescribed areas of two icons. Specifically, the icon "1" and the icon "2" are displayed in the state that a move button is added across between the first prescribed area at the right side of the icon "1" and the first prescribed area at the left side of the icon "2". As described above, as the display of a move button, it is only necessary that a move button is configured to be added to a part of an icon.

Figure 12:
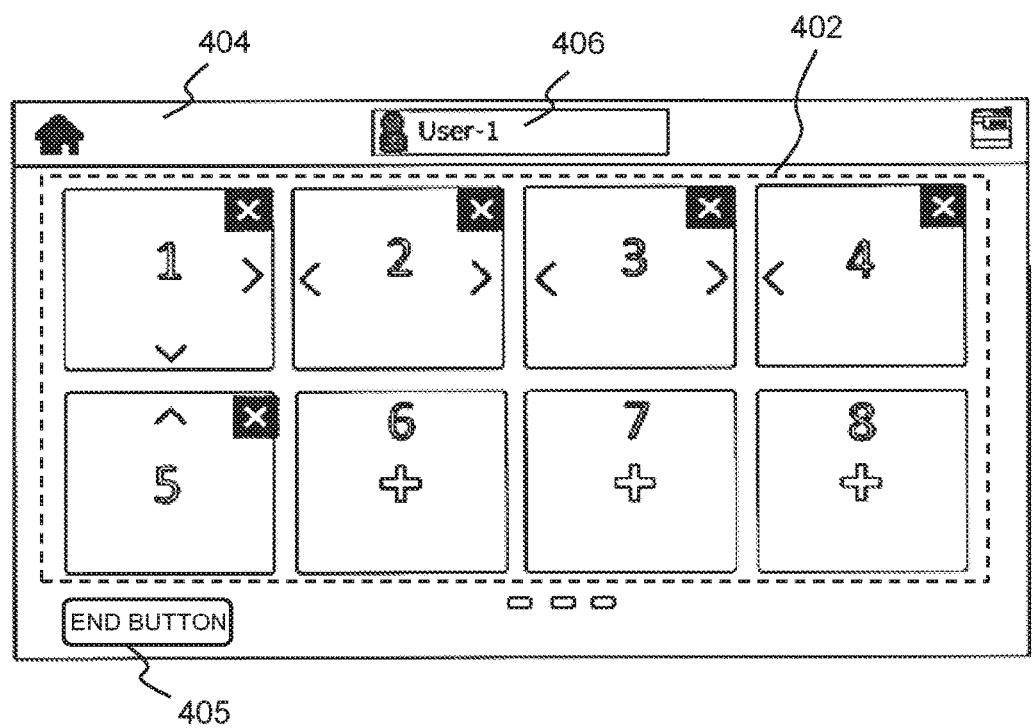
FIG. 12 is a view showing another display example of an edit operation screen which the image processing apparatus according to the first embodiment displays.

Further, in the above-described embodiment, a display example that undefined icons are collectively arranged at the right side of the display screen of the touch panel display 40 has been described, but the display is not limited to this. As another example, undefined icons may be displayed in the state that they are collectively arranged at the left side of the display screen. Further, undefined icons may be displayed in the state that they are collectively arranged at the lower side of the display screen, as shown in FIG. 12, and further undefined icons may be displayed in the state that they are collectively arranged at the upper side thereof.

Hereinafter, an image processing apparatus according to a second embodiment will be described. In the above-described image processing apparatus according to the first embodiment, it is possible to exchange display positions of all icons (defined icons) each of which is assigned with a function of the apparatus. In contrast, in the second embodiment, the exchange of a display position of a specific icon out of the defined icons is prohibited. The specific icon is an icon to which a function is assigned by a system manager, for example. The image processing apparatus according to the second embodiment displays the above-described specific icon at a specific position of the display screens of the whole users, and prohibits the exchange of the display position thereof. Hereinafter, the above-described specific icon is referred to as "a manager defined icon", and the portions different from the first embodiment will be mainly described, and the description of the same portions will be omitted.

When a special function is routinely assigned to an icon, a manager defined icon is used. The special function includes a copy function aiming environmental consideration, such as double printing, and a 2 in 1 print mode, for example. Further, the special function includes a facsimile communication function and so on in which a destination is fixed. In addition, at the time of initial setting of a manager defined icon, a manager can set a display position of a manager defined icon to an optional position in the display screen. From this point, a manager defined icon has a technical property different from an undefined icon.

As described above, the exchange (movement) of a display position of the above-described manager defined icon is prohibited. For this reason, a manager defined icon is displayed in the display screen without being added with a move button. In this point, a manager defined icon is the same as the above-described undefined icon. Further, regarding a manager defined icon, erasing of the display and the release of the assigned function by a user except the manager are prohibited. For this reason, a manager defined icon is displayed in the display screen without being added with a definition release button (button of "X").

Figure 13:
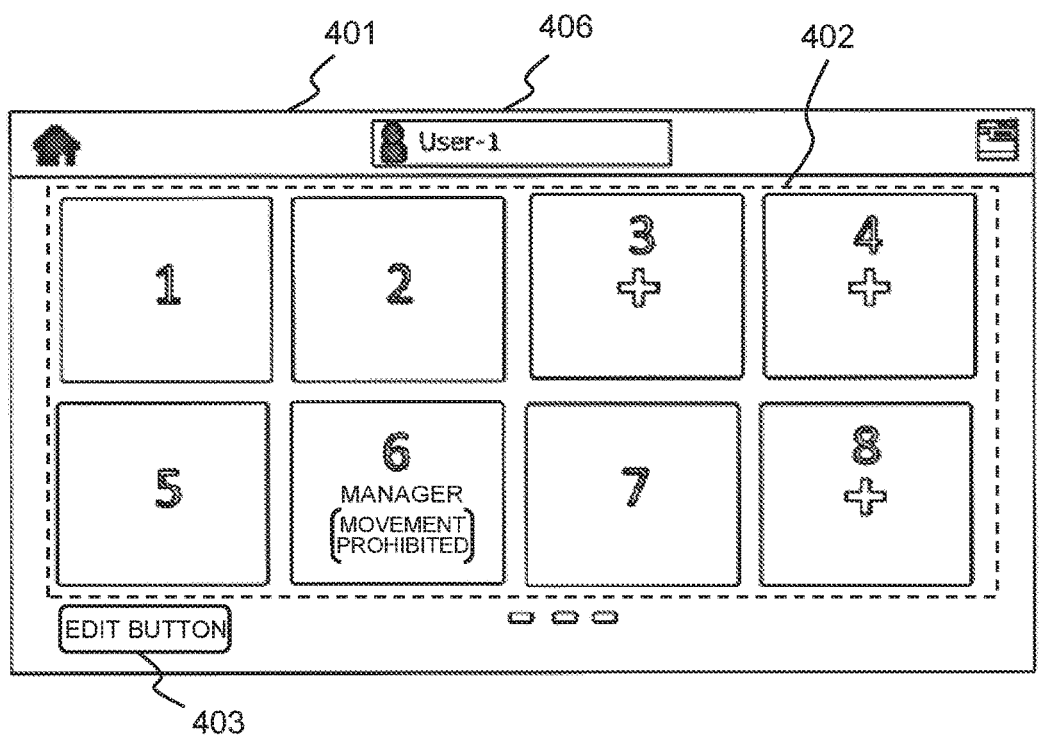
FIG. 13 is a view showing a selection operation screen including a manager defined icon which an image processing apparatus according to a second embodiment displays.
Figure 14:
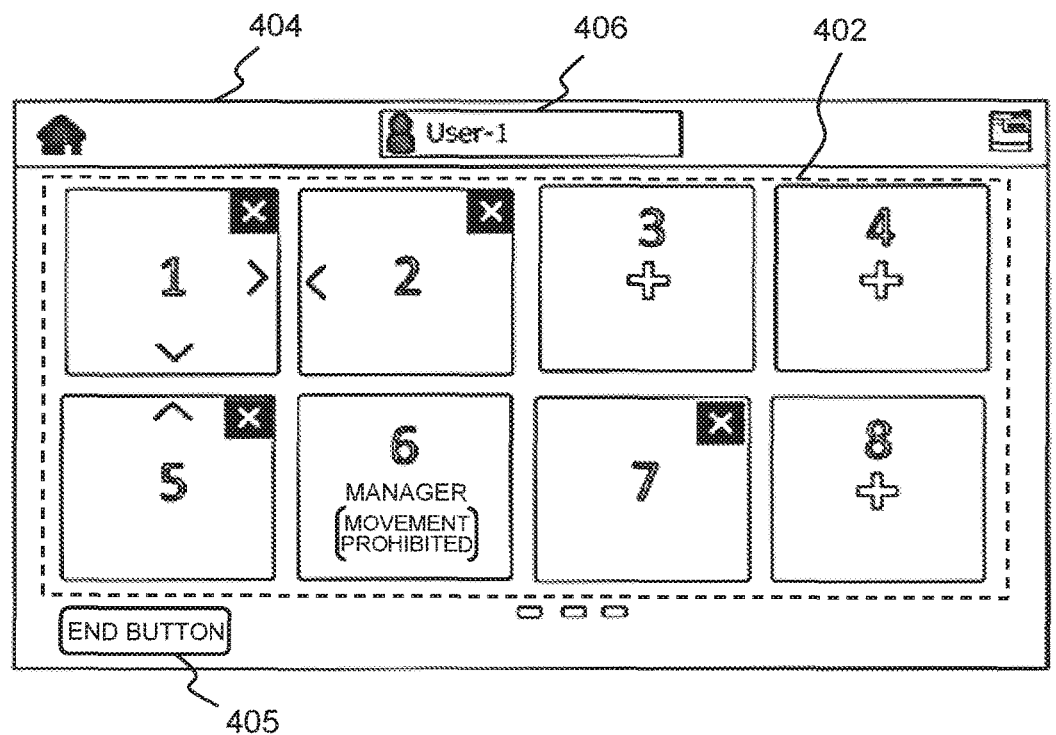
FIG. 14 is a view showing an edit operation screen including a manager defined icon which the image processing apparatus according to the second embodiment displays.

A manager defined icon will be described more specifically with reference to FIG. 13 and FIG. 14. FIG. 13 is a view showing the selection operation screen 401 in which a manager defined icon is displayed. FIG. 14 is a view showing the edit operation screen 404 in which a manager defined icon is displayed. As shown in FIGS. 13 and F9g. 14, the icon "6" is a manager defined icon. In the manager defined icon "6", an index of a character string of "MANAGER (MOVEMENT PROHIBITED)", for example, is written, so that it can be recognized by a user that the change of the display position is prohibited. Further, the manager defined icon "6" is displayed without being added with the above-described move button in the edit operation careen 404, as shown in FIG. 14. Further, the manager defined icon "6" is displayed without being added with the above-described release button, irrespective of being assigned with a function, because the release of the function by a general user is prohibited.

In the edit operation screen 404 shown in FIG. 14, when the manager defined icon "6" is assumed simply as an icon in which the change of the display position is prohibited, the icons adjacent to the defined icon "7" are all icons in which the change of the display position is prohibited. In other words, in the edit operation screen 404 shown in FIG. 14, the icon "7" is displayed in the state that it is surrounded in the horizontal and vertical directions by the icons in each of which the change of the display position is prohibited. Accordingly, the icon "7" cannot exchange the display position with the adjacent icons. Therefore, the icon "7" is displayed in the state that a move button is not added, but only a definition release button is added.

Figure 15:
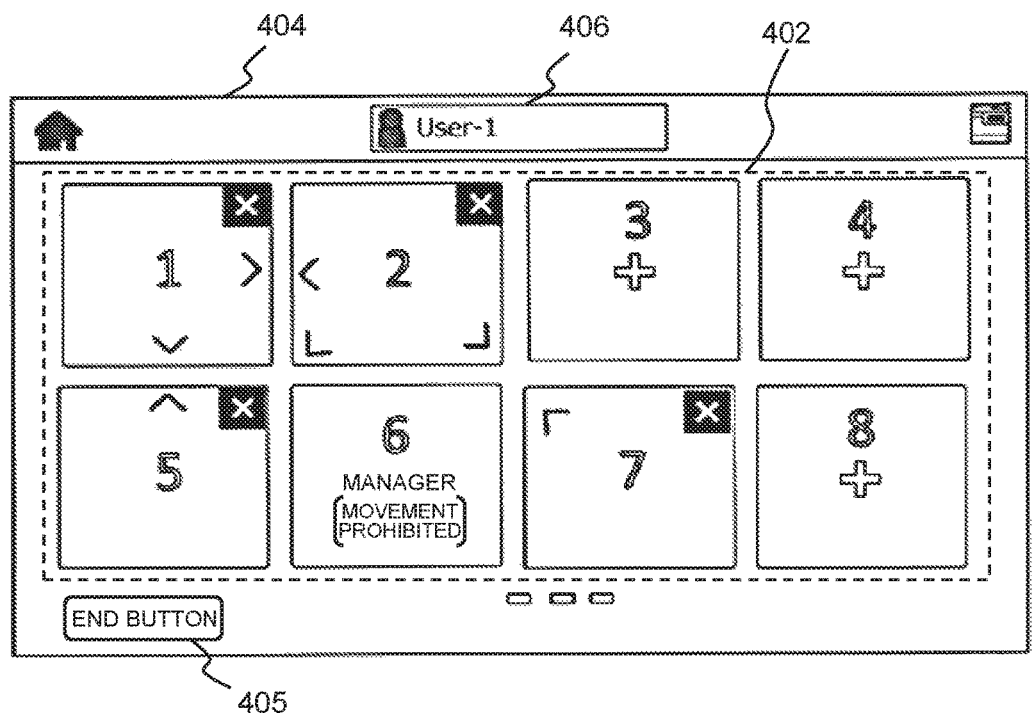
FIG. 15 is a view showing another display example of an edit operation screen including a manager defined icon which the image processing apparatus according to the second embodiment displays.

However, even in the case shown in FIG. 14, a move button is added to the first prescribed area at each corner portion of an icon, and thereby a user can change the display position of the icon "7". FIG. 15 is a view showing the edit operation screen 404 in which icons are respectively displayed in the state that a move button is added to the first prescribed area at each corner portion of an icon. The kind of each icon and the display position of each icon shown in FIG. 15 are the same as those in FIG. 14. As shown in FIG. 15, the icon "7" is displayed in the state that a move button is added to the first prescribed area at the obliquely upper left side of the icon "7". Further, the icon "2" adjacent to the icon "7" in the obliquely upper left direction of the icon "7" is displayed in the state that a move button is added to the first prescribed area at the obliquely lower right side of the icon "2". A user performs a touch operation to the above-described move button of the "7", icon or the above-described move button of the icon "2", and thereby can exchange the display positions of the icons between the icon "7" and the icon "2".

Further, a user can also exchange positions of icons between two defined icons which are located at the both sides of a manager defined icon. In this case, the two defined icons move across the manager defined icon. The processor 10 exceptionally permits the exchange of display positions of two defined icons which are located at the both sides of a manager defined icon.

Figure 16:
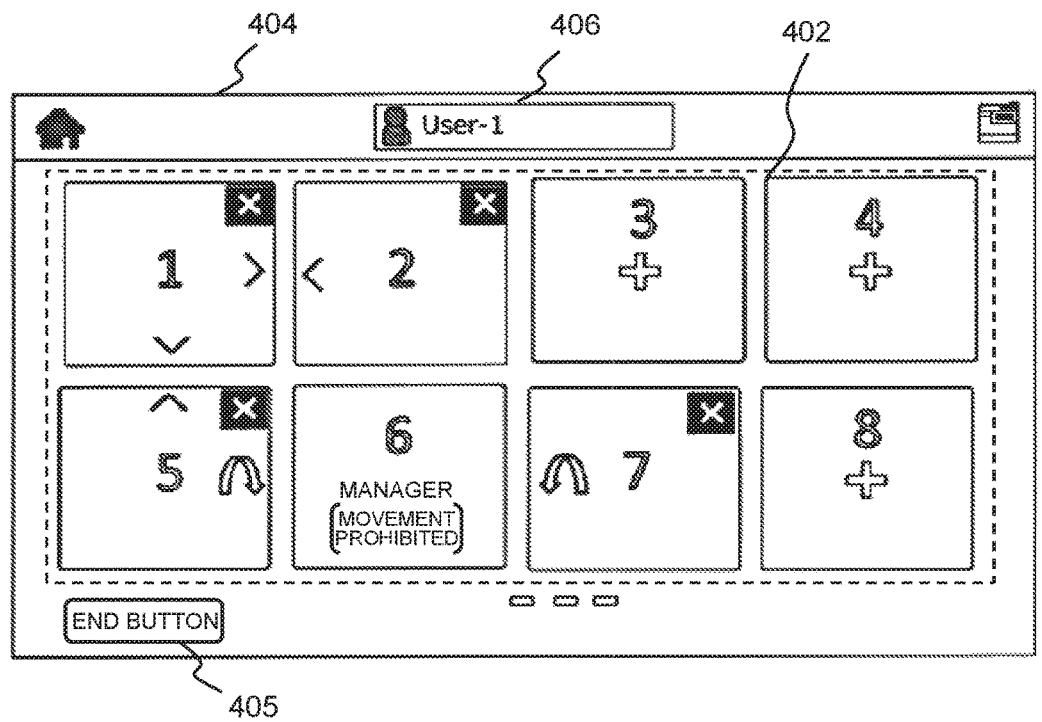
FIG. 16 is a view showing another display example of an edit operation screen including a manager defined icon which the image processing apparatus according to the second embodiment displays.
Figure 17:
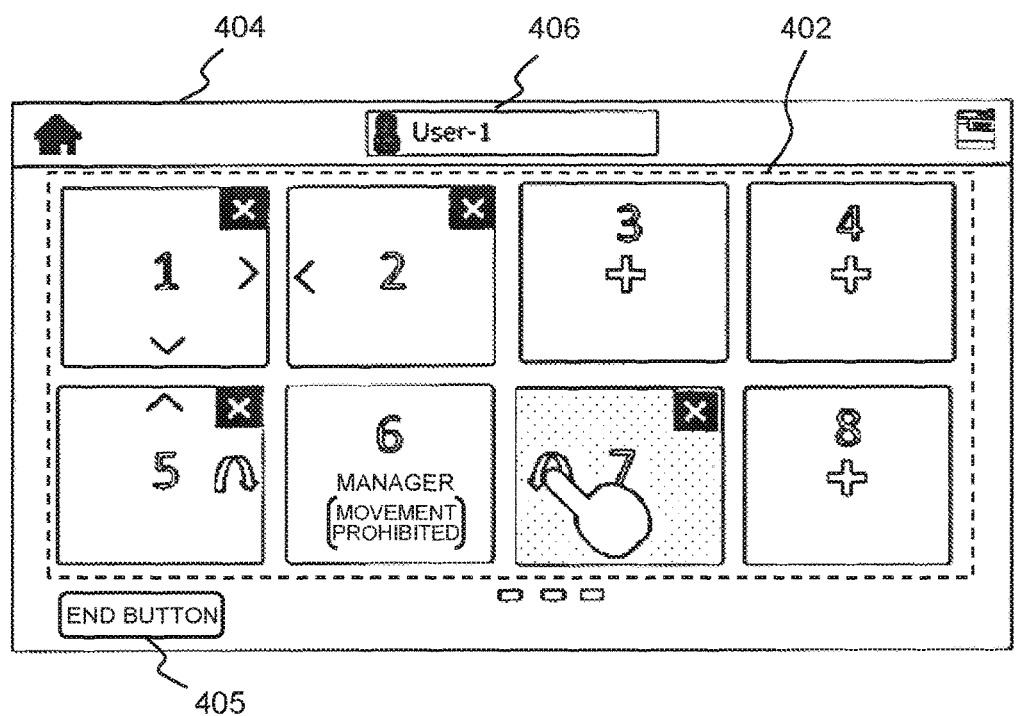
FIG. 17 is a view showing an operation example in the edit operation screen of FIG. 16 which the image processing apparatus according to the second embodiment displays.
Figure 18:
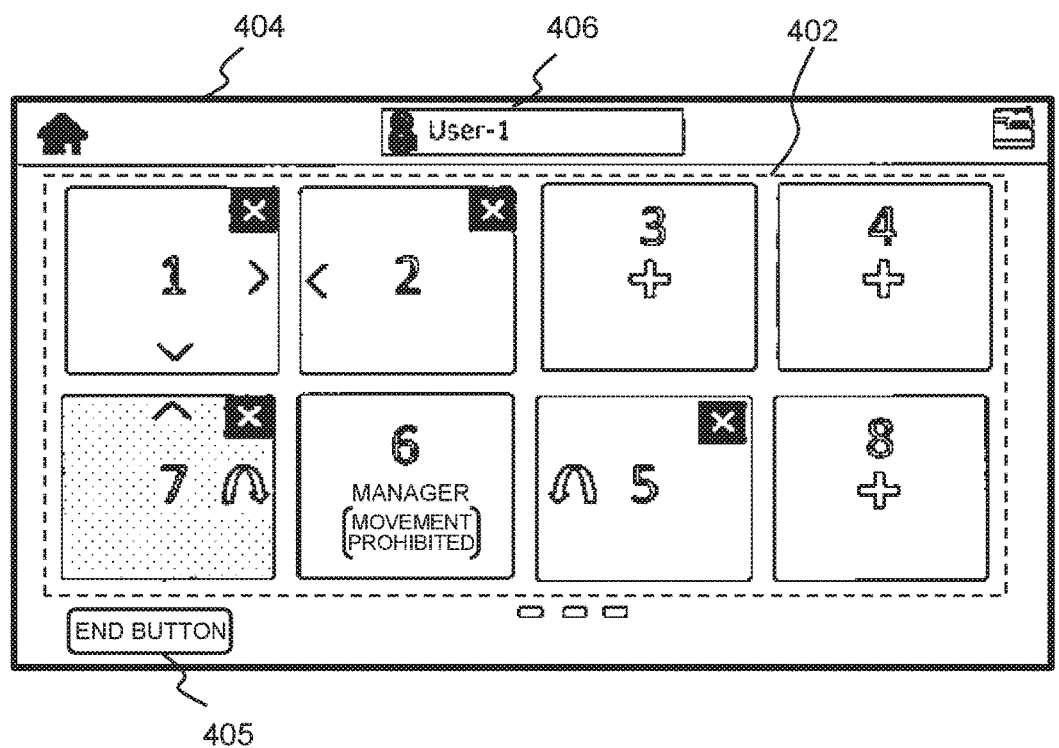
FIG. 18 is a view showing an operation example in the edit operation screen of FIG. 16 which the image processing apparatus according to the second embodiment displays.

The exchange of display positions of two defined icons which are located at the both sides of a manager defined icon will be described with reference to FIG. 16 to FIG. 18. FIG. 16 to FIG. 18 are views each showing the edit operation screen 404 including icons each of which is added with a move button for exchanging the above-described display positions. As shown in FIG. 16 to FIG. 18, the two defined icon "5" and defined icon "7" which are located at the both sides of the manager defined icon "6" are displayed, in the state that move buttons are respectively added to the first prescribed areas close to the left and right sides of the manager defined icon. Indexes indicating that the icon "5" and the icon "7" can move across the manager defined icon "6", such as indexes of curved arrow symbols are written in the above-described move buttons of the icon "5" and the icon "7", respectively. On the other hand, the icon "2" is displayed at the upper side of the manager defined icon, but a defined icon does not exist at the lower side of the manager defined icon. In other words, regarding the icon "2", a target defined icon in which the display position is to be exchanged across the manager defined icon "6" does not exist. Accordingly, the icon "2" is displayed without being added with the above-described move button in the first prescribed area at the lower side close to the manager defined icon.

From the state of the edit operation screen shown in FIG. 16, a user performs a touch operation with a finger or the like of the move button in the first prescribed area at the left side of the icon "7" or the move button in the first prescribed area at the right side of the icon "5", as shown in FIG. 17. When the user performs the touch operation of the move button, the display positions of the icon "7" and the icon "5" are exchanged to each other, as shown in FIG. 18.

As described above, even when the above-described specific icon (manager defined icon) exists in which the exchange of display position of the icon is prohibited, the image processing apparatus according to the second embodiment adds the above-described move buttons respectively to two icons adjacent at the both sides of the specific icon and displays the two icons. In other words, the image processing apparatus adds move buttons respectively to a pair of icons opposite to each other via the specific icon, and displays the pair of icons. In the pair of icons, the positions where the move buttons are added are the first prescribed areas close to the specific icon, respectively. A user performs a touch operation to the above-described move button, and thereby can exchange the display positions of the above-described pair of icons, across the above-described specific icon. Therefore, according to the image processing apparatus according to the second embodiment, the usability with respect to the exchange of display positions of defined icons can be ensured, irrespective of a display position of a specific icon.

The image processing apparatus according to the second embodiment can fundamentally perform the editing of a display position of an icon and so on, in accordance with the above-described flow chart of FIG. 4.

The image processing apparatus of each of the above-described embodiments changes display positions of two icons, in accordance with one touch operation of a user to a move button added to the icon. Accordingly, even a user who is inexperienced in a touch operation of drag and drop can change easily and rapidly a display position of an icon to a desired position. Accordingly, the image processing apparatus can improve usability in the operation input unit.

In the image processing apparatus of each of the above-described embodiments, respective icons displayed in the display screen have mutually the same external shape. But it is not necessary that the external shapes of the respective icons are mutually completely the same. For example, a defined icon may have an external shape different from those of an undefined icon and a manager defined icon. The external shape of a defined icon is made different, and thereby a user can distinguish the defined icon at first glance. Further, it is not always necessary that defined icons themselves have mutually the same external shape. However, it is preferable that defined icons have mutually the same external shape, from the viewpoint of the definition of the coordinate of each button displayed on an icon, and simplification of the processing, and so on.

Further, in the image processing apparatus of each of the above-described embodiments, the operation unit 4 is arranged above the document table, and is supported movably by the rotatable and bendable arm member. However, the arrangement and the supporting method of the operation unit 4 are not limited. For example, the operation unit 4 may be fixed and supported at the front side (a side close to a user) of the document table.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-transitory storage medium that stores a computer executable program causing an image processing apparatus to perform operations comprising:
    displaying, on a display screen, a plurality of defined objects including at least a first defined object and a second defined object, each of which is assigned to a function of the apparatus by a user, wherein the display screen detects a selection of one of the defined objects by an operation of the user;
    causing the plurality of defined objects, including the first defined object and the second defined object, to be displayed on the display screen in an edit mode for editing a display position of the defined objects object in the display screen, a first predetermined area of at least one of the first defined object and second defined object including a move button displayed thereon;
    detecting an operation selecting the move button, and in response, changing display setting data for displaying the plurality of objects so that the display positions of the first defined object and the second defined object are exchanged;
    executing an operation for the function assigned to the relevant object, when a selection of any object out of the plurality of objects is detected, when the apparatus is not in the edit mode, after the edit mode is finished;
    displaying, on the display screen, an undefined object not assigned to a function of the apparatus, in addition to the defined object; and
    in the edit mode, displaying the plurality of defined objects and the undefined object so that the move button is not included on the undefined object.

2. The non-transitory storage medium according to claim 1, wherein the first predetermined area is an area of the first defined object proximate to the second defined object.

3. The non-transitory storage medium according to claim 2, wherein the move button is on the first predetermined area and extends to a second predetermined area of the second defined object proximate to the first predetermined area.

4. The non-transitory storage medium according to claim 3, wherein the computer executable program causes the computer to perform further operations comprising:
    displaying, on the display screen, an undefined object not assigned to a function of the apparatus, and
    in the edit mode, prohibiting change of a display position of the undefined object.

5. The non-transitory storage medium according to claim 3, wherein the move button is included on each of the plurality of defined objects and not on the undefined object.

6. The non-transitory storage medium according to claim 4, wherein:
    a third predetermined area of the first defined object, different from the first predetermined area, includes a release button, and
    the computer executable program causes the computer to detect an operation selecting the release button, and in response, cause the first defined object to be not assigned to a function of the apparatus.

7. The non-transitory storage medium according to claim 6, wherein, when the operation selecting the release button is detected, the first defined object is changed to the undefined object.

8. The non-transitory storage medium according to claim 7, wherein:
    the undefined object is one of a plurality of undefined objects, and
    the plurality of undefined objects are displayed together in a predetermined area of the display screen.

9. The non-transitory storage medium according to claim 8, wherein the computer executable program causes the computer to perform further operations comprising:
    displaying, on the display screen, a specific defined object to which a function of the apparatus is assigned by a manager, and
    in the edit mode, prohibiting change of a display position of the specific defined object.

10. The non-transitory storage medium according to claim 9, wherein the first defined object and the second defined object are a pair of defined objects, each displayed on the display screen on opposite sides of the specific defined object.

11. The non-transitory storage medium according to claim 10, wherein the move button is displayed on at least one defined object out of the pair of defined objects.

12. The non-transitory storage medium according to claim 11, when the operation selecting the move button displayed on at least one of the pair of defined objects is detected, the display positions of each of the defined objects in the pair of defined objects are exchanged across the specific defined object.

* * * * *